(12) United States Patent
Bark

(10) Patent No.: US 6,185,437 B1
(45) Date of Patent: Feb. 6, 2001

(54) SYSTEM AND METHOD FOR RECONFIGURING AT LEAST A PORTION OF A CELLULAR TELECOMMUNICATIONS NETWORK

(75) Inventor: Anna-Sofie Bark, Linköping (SE)

(73) Assignee: Telefonaktiebolaget LM Ericsson, Stockholm (SE)

( * ) Notice: Under 35 U.S.C. 154(b), the term of this patent shall be extended for 0 days.

(21) Appl. No.: 09/135,570

(22) Filed: Aug. 18, 1998

(30) Foreign Application Priority Data

Aug. 20, 1997 (GB) .................................................. 9717675

(51) Int. Cl.⁷ ........................................................ H04B 1/38
(52) U.S. Cl. .......................... 455/560; 455/67.1; 455/453; 455/56.1
(58) Field of Search ..................... 455/560, 67.1, 455/453, 561, 447, 449

(56) References Cited

U.S. PATENT DOCUMENTS

| | | | |
|---|---|---|---|
| 5,434,798 | * | 7/1995 | Madebrink et al. ................ 455/33.1 |
| 5,781,628 | * | 7/1998 | Alperovich et al. ..................... 380/9 |
| 5,842,130 | * | 11/1998 | Oprescu-Surcobe et al. ....... 455/456 |
| 5,848,244 | * | 12/1998 | Wilson ............................ 395/200.51 |

FOREIGN PATENT DOCUMENTS

92/21182   11/1992   (WO) .

* cited by examiner

*Primary Examiner*—Thanh Cong Le
*Assistant Examiner*—Lana Le
(74) *Attorney, Agent, or Firm*—Nixon & Vanderhye P.C.

(57) ABSTRACT

A method is disclosed for performing a reconfiguration of a cellular telecommunications network, for example in the event that a base station becomes inoperative, or if it becomes necessary to increase traffic capacity by splitting a cell. Each base station controller, and an operator support system, each include a database containing prestored sets of parameters or cell profiles. If one of these stored cell profiles is suitable for use in a reconfiguration, it can be selected at the operator support system, and then retrieved from the database in each affected base station controller. This avoids the need to carry out consistency checks on the cell profile, because it will have been checked before being stored. Moreover, only a simple command needs to be sent to the base station controller, and it is not necessary to transmit the complete file containing all of the cell parameters. Thus reconfigurations can be carried out more efficiently.

10 Claims, 2 Drawing Sheets

SYSTEM AND METHOD FOR RECONFIGURING AT LEAST A PORTION OF A CELLULAR TELECOMMUNICATIONS NETWORK

TECHNICAL FIELD OF THE INVENTION

This invention relates to the management of a cellular radio telephone system. More particularly, the invention relates to a method of reconfiguration of such a system, for example as a result of changing traffic requirements, and to apparatus which permits the use of such a method.

DESCRIPTION OF RELATED ART

A cellular mobile telecommunications system divides the geographical area which it covers into a plurality of cells. Each cell typically includes a base station (alternatively, each base station may serve more than one cell), and the different base stations are each connected to a base station controller which can transmit commands to the various base stations.

In use of such a system, situations arise in which it becomes necessary to reconfigure the system. For example, if a base station becomes inoperative, traffic in the cell or cells associated therewith must be reassigned to other base stations. On the other hand, cells may need to be split, either because of a general increase in the number of subscribers using the system, or because of a temporary increase in the number of subscribers present in one particular cell. Splitting the cell then increases the traffic capacity in the area served by that cell.

WO92/21182 discloses a method and apparatus for performing reconfiguration of a cellular network. In accordance with the procedure disclosed in WO92/21182, the existing cell parameters are copied to a database in an administrative centre in the network; the desired changes to the cell parameters are entered by the network planners; the suggested parameter changes are verified for consistency by a computer system, and amended if required; the new cell parameters are sent from the administrative centre to the base station controllers and hence to the base stations; and the reconfiguration then becomes effective.

Commands are sent from the administration centre to the base station controllers in man-machine language. Moreover, these commands must be sent in a specific order, commands must be sent relating to a large number of parameters, and each of the commands must be checked for consistency. All of these points mean that reconfiguration is a lengthy process, which requires large amounts of signalling between the administration centre and the base station controller.

WO92/21182 further discloses that the administration centre may store predefined sets of changes, for use in the event that a particular base station or base station controller is out of service. However, even in the event that one of these predefined sets of changes is to be implemented, the changes are still subject to consistency checks, and details of all of the predefined changes must be transmitted from the administration centre to the base station controllers affected by the changes.

Thus, the time consuming consistency checks must still be carried out, and large amounts of signalling must be performed before the reconfiguration can be implemented.

SUMMARY OF THE INVENTION

In accordance with the invention, a number of cell profiles (that is, sets of cell parameters) are predefined, and stored both in the administration centre and in each base station controller. In the event of a reconfiguration, a simple command can be sent from the administration centre to the affected base station controllers, and the reconfiguration can be implemented immediately, without requiring additional consistency checks, because the predefined cell profiles will be known to be consistent. Further, because the desired new cell profile is already stored in the relevant base station controller, it is only necessary to send a short message thereto, and it is not necessary to transmit full details of the new cell parameters, thus reducing the load on the links between the administration centre and the affected base station controllers.

This has the advantage that system reconfigurations can be carried out much more simply.

Moreover, because there is in principle no limit on the number of cell profiles which can be stored, and because further changes to the stored cell profiles can also be implemented, there is no loss of flexibility for the operator in reconfiguring the system.

DETAILED DESCRIPTION OF PREFERRED EMBODIMENTS

Figure 1:
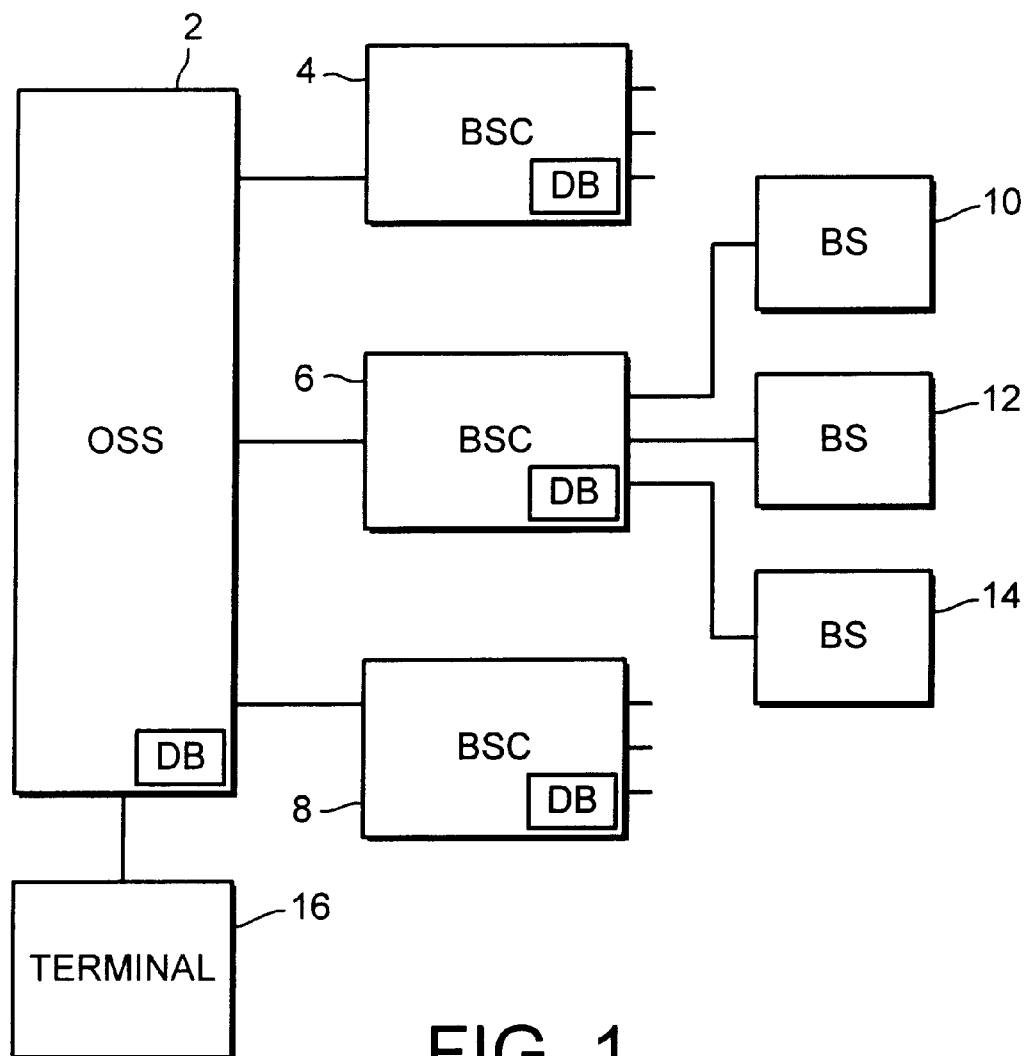
FIG. 1 is a block schematic diagram of a cellular communications network in accordance with the invention.

The network of FIG. 1 includes an administration centre, or operator support system (OSS) 2, which communicates with the base station controllers (ESC) 4, 6, 8, of which only three are shown in the Figure.

Each base station controller communicates with respective base stations (BS) 10, 12, 14. Again, only three base stations are shown in FIG. 1, although it will be appreciated that these are representative of many more such base stations present in the network. Connected to the operator support system 2 is a terminal 16, for operator input of data, commands, etc.

It will be noted that the operator support system 2, and each base station controller 4, 6, 8 includes a respective database DB, which contains a set of files, each of which contains a default value for each of the cell parameters. The different files can contain profiles with different parameter values, to take account of the different ways in which the system may be reconfigured. The parameters making up a cell profile may include: cell measurement data, cell description data, signal strength data, base station power data, cell neighbouring relations, and cell configuration frequency data.

Figure 2:
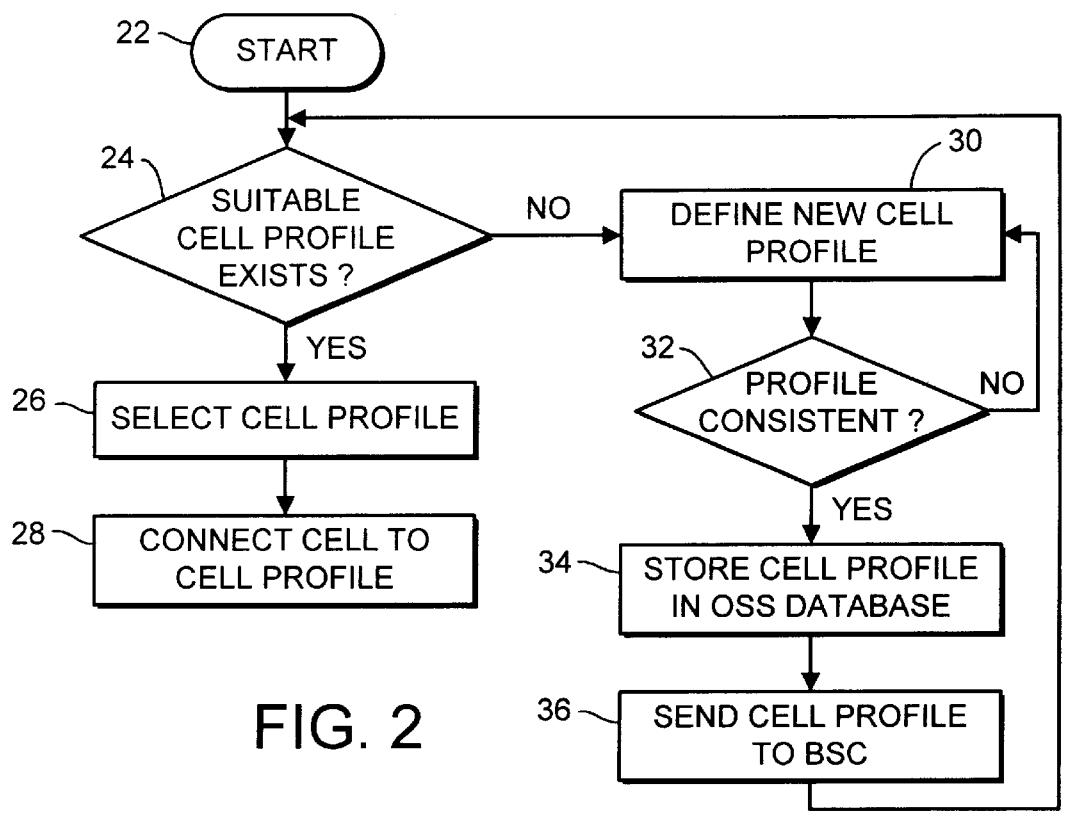
FIG. 2 is a flow chart illustrating a reconfiguration process in accordance with another aspect of the invention.

The use of the invention is illustrated in the flowchart of FIG. 2. The process of FIG. 2, carried out within the operator support system 2 of FIG. 1 under the control of an operator using the terminal 16, begins with step 22. In this step, the operator determines that a system reconfiguration is necessary, for example because a base station has become inoperative, or because of increased traffic requirements in one or more cells, or for some other reason. The process then moves to step 24, in which the operator is able to examine files stored in the database DB within the operator support system 2, to determine whether that database contains a stored set of cell parameters, known as a cell profile, which are suitable for use in a particular cell in the present situation. If so, the process moves to step 26, in which the operator inputs a command to select that cell profile, and to step 28, in which the cell profile is associated with the cell under consideration in the system record, and a command is sent to the base station controller to retrieve that particular cell profile from its own database DB for association with the cell. The cell profile may be identified in the databases of the OSS and each BSC by a file name, and the command may identify it by that filename. The necessary signalling is then sent to the relevant base station or base stations to make the selected set of cell parameters effective.

Thus, in this case, where an appropriate set of cell parameters already exists in the OSS database, it can be brought into operation in the relevant cell by means of a simple command sent from the OSS to the base station controller. Because the same set of cell parameters also exists in the base station controller database, it is not necessary to transmit the whole contents of the file.

Further, it is very much easier for the operator to select a previously created cell profile, than to create a new cell profile, which conventionally requires large quantities of data to be input without error.

Moreover, because the set of cell parameters has been created previously, it can be brought into operation without needing to be subjected to consistency checks. This means that the reconfiguration can be effected more quickly.

If, at step 24 in the process of FIG. 2, it is determined that no suitable cell profile exists in the database of the operator support system 2, the process passes to step 30. In this step, a new cell profile is defined. This can be done in a conventional way, or the operator could use an existing pre-stored cell profile as a base for the new cell profile, to minimise the work involved in the creation thereof.

Once the new cell profile has been created, it is subjected to consistency checks in step 32, in a conventional way. If the profile fails those checks, the process returns to step 30 for amendment to the profile.

Once the profile has passed the consistency checks, the process passes to step 34, in which the parameters are stored in the database DB within the operator support system 2, and then to step 36, in which the parameters are sent to each of the base station controllers to be stored in the respective databases DB thereof.

Thus, at all times, all previously created sets of cell parameters, stored in the OSS database, are also stored in the databases of all of the base station controllers, for implementation when required.

Following completion of step 36, the process returns to step 24, in which it will then be found that the newly created cell profile is suitable, and then to steps 26 and 28, in which that cell profile will be made effective the desired cell or cells.

Moreover, if the required reconfiguration will have only a small effect, it remains possible to change cell parameters in a conventional way, by sending commands in man-machine language from the terminal 16 through the OSS 2 to the relevant base station controller.

There are thus disclosed a method of reconfiguration, and systems for use therein, which allow reconfigurations to be carried out efficiently.

What is claimed is:

1. A method of reconfiguration in a cellular telephone network, the method comprising the steps of:

storing each of a plurality of predefined cell profiles in each of (a) a database at a control location, and (b) respective databases at each of a plurality of base station controllers;

selecting one of the prestored cell profiles for use in reconfiguring at least a system of the network, wherein said step of selecting one of the prestored cell profiles is performed using the database at the control location;

sending a command to at least one base station controller affected by the reconfiguration indicating which of the prestored cell profiles was selected in said selecting step; and retrieving the cell profile indicated by the command from a database in the at least one base station controller, so that the entire prestored cell profile need not be transmitted to the at least one base station controller from the control location during said reconfiguration.

2. A method as claimed in claim 1, wherein said reconfiguration is carried out without performing consistency checks on prestored cell profiles used in said reconfiguration.

3. A method of reconfiguring a cellular telecommunications network including a plurality of base station controllers and a control location, the method comprising the steps of:

selecting a set of cell parameters from a plurality of sets of cell parameters stored in a first database at the control location, the selected set of cell parameters being identified by a filename;

sending a command from the control location to each base station controller affected by the reconfiguration, the command identifying the selected set of cell parameters; and retrieving the selected set of cell parameters from a second database at each affected base station controller so that the set of cell parameters need not be transmitted to each affected base station controller from the control location during said reconfiguration.

4. A method as claimed in claim 3, further comprising implementing the selected set of cell parameters at the affected base station controller.

5. A method of reconfiguring a cellular telecommunications network including a plurality of base station controllers and a control location, the method comprising the steps of:

inputting a set of desired cell parameters, for implementation in one of said base station controllers during said reconfiguration;

subjecting the input cell parameters to consistency checks; and if the input cell parameters pass the consistency checks, storing the input cell parameters in respective databases in each of the plurality of base station controllers and in the control location for later use in a reconfiguration, so that in said reconfiguration involving a given set of cell parameters the given set of cell parameters need not be again transmitted to the at least one base station controller from the control location during said reconfiguration.

6. A method of operation of a cellular telephone network, the method comprising:

storing predefined cell profiles in respective databases in both (a) a system controller, and (b) in a plurality of base station controllers within the network; and thereafter reconfiguring at least a portion of the network in a manner such that an affected base station controller can retrieve at least one of said cell profiles from its corresponding database without having the system controller transmit said at least one cell profile to the base station controller in order to implement said reconfiguring.

7. A base station controller, for use in a cellular telecommunications network, the base station controller comprising a database containing a plurality of cell profiles, and means for accessing the cell profiles in response to a command from a system controller indicative of a given cell profile so that reconfiguration may be performed by the base station controller without the base station controller having to receive said given cell profile from said system controller during said reconfiguration, and means for transmitting data to base stations.

8. A system controller, for use in a cellular telecommunications network, the system controller comprising a database containing a plurality of cell profiles, and means for accessing the cell profiles in response to a command from an operator, and means for transmitting data to base station controllers indicative of a given cell profile so that reconfiguration may be performed by base station controllers without the base station controllers having to receive said given cell profile from said system controller during said reconfiguration.

9. A system controller as claimed in claim 8, further comprising means for performing consistency checks on newly entered cell profiles.

10. A system controller as claimed in claim 9, further comprising means for storing newly entered cell profiles found to pass the consistency checks, and for transmitting the newly entered cell profiles found to pass the consistency checks to base station controllers connected thereto.

\* \* \* \* \*